United States Patent
Jiang et al.

(10) Patent No.: US 12,108,443 B2
(45) Date of Patent: Oct. 1, 2024

(54) METHOD AND DEVICE FOR USE IN WIRELESS COMMUNICATION NODES

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 429 days.

(21) Appl. No.: 17/485,540

(22) Filed: Sep. 27, 2021

(65) Prior Publication Data

US 2022/0046703 A1 Feb. 10, 2022

Related U.S. Application Data

(63) Continuation of application No. PCT/CN2020/080849, filed on Mar. 24, 2020.

(30) Foreign Application Priority Data

Apr. 2, 2019 (CN) .......................... 201910261796.9

(51) Int. Cl.
*H04W 74/0808* (2024.01)
*H04W 72/044* (2023.01)

(52) U.S. Cl.
CPC ..... *H04W 74/0808* (2013.01); *H04W 72/044* (2013.01)

(58) Field of Classification Search
CPC ........... H04W 74/0808; H04W 72/044; H04W 72/0453; H04L 1/1671; H04L 1/1861; H04L 5/00; H04L 5/0053; H04L 5/0094
See application file for complete search history.

(56) References Cited

U.S. PATENT DOCUMENTS

| | | | |
|---|---|---|---|
| 2012/0122467 A1* | 5/2012 | Auer ...................... | H04W 16/10 455/450 |
| 2018/0124687 A1* | 5/2018 | Park ...................... | H04W 48/12 |

(Continued)

FOREIGN PATENT DOCUMENTS

| | | |
|---|---|---|
| CN | 1348663 A | 5/2002 |
| CN | 1741412 A | 3/2006 |

(Continued)

OTHER PUBLICATIONS

First Office Action of Chinses patent application No. CN201910261796.9 dated Jan. 10, 2023.

(Continued)

*Primary Examiner* — Mohammad S Adhami
*Assistant Examiner* — Jesse P. Samluk

(57) ABSTRACT

The present disclosure provides a method and device for use in wireless communication nodes. A first node executes a first monitoring and a second monitoring, judges whether a first channel and a second channel are available respectively according to the first monitoring and the second monitoring; a target bit block being transmitted on which of a first channel or a second channel is related to whether the second channel is judged to be unavailable; the first channel overlaps with the second channel in time domain; the second channel occupies K subbands in frequency domain; when a number of idle subbands on the second channel is less than K1, the second channel is judged to be unavailable. The present disclosure establishes a connection between frequency-domain resources occupied by a target bit block and a monitoring result to improve uplink transmission efficiency on unlicensed spectrum.

20 Claims, 11 Drawing Sheets

(56) References Cited

U.S. PATENT DOCUMENTS

| | | | | |
|---|---|---|---|---|
| 2019/0190668 A1* | 6/2019 | Lei | .................... | H04L 1/0017 |
| 2020/0266861 A1* | 8/2020 | Nammi | ................ | H04L 5/0005 |
| 2023/0026357 A1* | 1/2023 | Lei | .................... | H04L 1/1861 |

FOREIGN PATENT DOCUMENTS

| | | |
|---|---|---|
| CN | 107124916 A | 9/2017 |
| CN | 107295677 A | 10/2017 |
| CN | 109302739 A | 2/2019 |
| WO | 2018084544 A1 | 5/2018 |

OTHER PUBLICATIONS

First Search Report of Chinses patent application No. CN201910261796.9 dated Dec. 15, 2022.
ISR in application PCT/CN2020/080849 dated May 19, 2020.
Interdigital."SR in NR-U"3GPP TSG-RAN WG2 Meeting#1O3bis R2-1814O09.Oct. 12, 2018(Oct. 12, 2018). section 2.
Huaweiet al."Coexistence and Channel Access for NR Unlicensed Band Operations"3GPP TSGRAN WG1 Meeting #95R1-1812194. Nov. 16, 2018(Nov. 16, 2018).

* cited by examiner

METHOD AND DEVICE FOR USE IN WIRELESS COMMUNICATION NODES

CROSS REFERENCE TO RELATED APPLICATIONS

This application is a continuation of International Application No. PCT/CN2020/080849, filed Mar. 24, 2020, claims the priority benefit of Chinese Patent Application No. 201910261796.9, filed on Apr. 2, 2019, the full disclosure of which is incorporated herein by reference.

BACKGROUND

Technical Field

The present disclosure relates to transmission methods and devices in wireless communication systems, and in particular to a method and device for transmitting uplink control information in wireless communications.

Related Art

Application scenarios of future wireless communication systems are becoming increasingly diversified, and different application scenarios put forward different performance demands on systems. In order to meet different performance requirements of a variety of application scenarios, beamforming is widely used in New Radio (NR) design of Rel-15 version to improve transmission performance. In NR system of Rel-16, in order to further improve transmission performance and reduce transmission delay, a Study Item (SI) for NR-U physical layer enhancement was proposed in RAN #81 plenary. In this project, wireless transmissions on a plurality of unlicensed Bandwidth Parts (BWPs) will be studied and designed.

SUMMARY

According to latest progress of RAN1 #95 meeting on NR-U, when a plurality of unlicensed BWPs perform uplink transmissions, one possible way is to configure and activate a plurality of BWPs, and a Physical Uplink Shared Channel (PUSCH) is transmitted on one or the plurality of BWPs; further, transmissions of LBT based on a subband and its corresponding PUSCH are also discussed in RAN1. However, in the current NR system, when a UE transmits a Physical Uplink Control Channel (PUCCH) and a PUSCH simultaneously in a slot, Uplink Control Information (UCI) corresponding to the PUCCH is transmitted in time-frequency resources reserved for the PUSCH through piggybacking, the advantage of the above method is to ensure sufficient uplink transmit power without causing too high Peek-to-Average Power Ratio (PAPR). However, when the PUSCH is transmitted only in partial subbands passing LBT, how to transmit piggybacked UCI will be a problem.

A simple solution to the above problem is that the UCI also follows a transmission mode of the PUSCH, that is, the UCI is transmitted in subbands passing LBT, while the UCI in subbands that do not pass LBT will be dropped to be transmitted; however, this method will obviously affect the transmission performance of the UCI. The application discloses a solution to improve transmission performance of the UCI on the NR-U. It should be noted that embodiments of the first node in the present disclosure and characteristics of the embodiments can be applied to the base station if no conflict is incurred, and the embodiments of the second node in the present disclosure and characteristics of the embodiments can be applied to the terminal. And the embodiments in the present disclosure and the characteristics in the embodiments can be arbitrarily combined if there is no conflict.

The present disclosure provides a method in a first node for wireless communications, comprising:

executing a first monitoring and a second monitoring;
judging whether a first channel and a second channel are available according to the first monitoring and the second monitoring respectively; and
when the first channel is judged to be available and the second channel is judged to be unavailable, transmitting a target bit block on the first channel; when the second channel is judged to be available, transmitting a target bit block on the second channel;

herein, the first channel overlaps with the second channel in time domain; the second channel occupies K subbands in frequency domain, K being a positive integer greater than 1; when a number of idle subbands on the second channel is less than K1, the second channel is judged to be unavailable, and when a number of idle subbands on the second channel is not less than K1, the second channel is judged to be available; K1 is a positive integer not greater than K.

In one embodiment, one advantage of the above method includes: frequency-domain resources corresponding to a first monitoring are reserved for PUCCH transmission, and frequency-domain resources corresponding to a second monitoring are reserved for PUSCH transmission; that is, whether the UCI is transmitted in the PUCCH or the PUSCH is judged according to the result of LBT, so as to ensure the performance of the UCI.

In one embodiment, another advantage of the above method includes: a value of K1 is defined; when a number of subbands occupied by the PUSCH passing LBT is large (corresponding to a scenario of not less than K1), the UCI is transmitted on the PUSCH to save PUCCH resources; when a number of subbands occupied by the PUSCH passing LBT is small (corresponding to a scenario of less than K1), the UCI is transmitted on the PUCCH to ensure performance of the UCI.

In one embodiment, another advantage of the above method includes: the design in the application does not involve recoding and resources remapping of the UCI according to the result of LBT; the first node generates two UCI coding and mapping schemes for piggybacking mode and non-piggybacking mode respectively according to an uplink grant scheduling the PUSCH and scheduling information corresponding to the PDSCH fed back by the UCI; the transmission performance of the UCI is improved without increasing too much complexity of the UE.

According to one aspect of the present disclosure, the above method is characterized in comprising:

transmitting a first radio signal in K2 subband(s) of the K subbands;
herein, the K2 subband(s) on the second channel is judged to be idle in the second monitoring; K2 is a positive integer less than K.

According to one aspect of the present disclosure, the above method is characterized in that the second channel is judged to be available, the target bit block is used to generate a first radio sub-signal, and the first radio signal comprises the first radio sub-signal.

According to one aspect of the present disclosure, the above method is characterized in comprising:

receiving a first signaling and a target radio signal;

herein, the first signaling is used to determine at least one of time-domain resources occupied by the target radio signal or frequency-domain resources occupied by the target radio signal; the target bit block is used to determine whether the target radio signal is correctly received.

According to one aspect of the present disclosure, the above method is characterized in comprising:

receiving a second signaling;

herein, the second signaling is used to determine a first frequency-domain resource set, the first frequency-domain resource set comprises K frequency-domain resource subsets, and the K frequency-domain resource subsets are located in the K subbands respectively; a first bit block is used to generate the first radio signal; and the K frequency-domain resource subsets are reserved for transmitting the first bit block.

The present disclosure provides a method in a second node for wireless communications, comprising:

detecting a target bit block in both a first channel and a second channel;

herein, the first channel overlaps with the second channel in time domain; the second channel occupies K subbands in frequency domain, K being a positive integer greater than 1; a transmitter of the target bit block is a first node, the first node executes a first monitoring and a second monitoring, and judges whether the first channel and the second channel are available respectively according to the first monitoring and the second monitoring; when a number of idle subbands on the second channel is less than K1, the second channel is judged to be unavailable, and the first node transmits the target bit block on the first channel; when a number of idle subbands on the second channel is not less than K1, the second channel is judged to be available and the first node transmits the target bit block on the second channel; K1 is a positive integer not greater than K.

According to one aspect of the present disclosure, the above method is characterized in comprising:

detecting a radio signal generated by a first bit block in the K subbands;

herein, the first node only transmits a first radio signal in K2 subband(s) of the K subbands; the first bit block is used to generate the first radio signal, and the K2 subband(s) on the second channel is(are) judged to be idle in a second monitoring; the first node executes the second monitoring; K2 is a positive integer less than K.

According to one aspect of the present disclosure, the method is characterized in that the second channel is judged to be available, the target bit block is used to generate a first radio sub-signal, and the first radio signal comprises the first radio sub-signal.

According to one aspect of the present disclosure, the above method is characterized in comprising:

transmitting a first signaling and a target radio signal;

herein, the first signaling is used to determine at least one of time-domain resources occupied by the target radio signal or frequency-domain resources occupied by the target radio signal; the target bit block is used to determine whether the target radio signal is correctly received.

According to one aspect of the present disclosure, the above method is characterized in comprising:

transmitting a second signaling;

herein, the second signaling is used to determine a first frequency-domain resource set, the first frequency-domain resource set comprises K frequency-domain resource subsets, and the K frequency-domain resource subsets are located in the K subbands respectively; and the K frequency-domain resource subsets are reserved for transmitting the first bit block.

The present disclosure provides a first node for wireless communications, comprising:

a first receiver, executing a first monitoring and a second monitoring; judging whether a first channel and a second channel are available according to the first monitoring and the second monitoring respectively; and a first transmitter, when the first channel is judged to be available and the second channel is judged to be unavailable, transmitting a target bit block on the first channel; and when the second channel is judged to be available, transmitting a target bit block on the second channel;

herein, the first channel overlaps with the second channel in time domain; the second channel occupies K subbands in frequency domain, K being a positive integer greater than 1; when a number of idle subbands on the second channel is less than K1, the second channel is judged to be unavailable, and when a number of idle subbands on the second channel is not less than K1, the second channel is judged to be available; K1 is a positive integer not greater than K.

The present disclosure provides a second node for wireless communications, comprising:

a second receiver, detecting a target bit block in both a first channel and a second channel;

herein, the first channel overlaps with the second channel in time domain; the second channel occupies K subbands in frequency domain, K being a positive integer greater than 1; a transmitter of the target bit block is a first node, the first node executes a first monitoring and a second monitoring, and judges whether the first channel and the second channel are available respectively according to the first monitoring and the second monitoring; when a number of idle subbands on the second channel is less than K1, the second channel is judged to be unavailable, and the first node transmits the target bit block on the first channel; when a number of idle subbands on the second channel is not less than K1, the second channel is judged to be available and the first node transmits the target bit block on the second channel; K1 is a positive integer not greater than K.

In one embodiment, the present disclosure has the following advantages over conventional schemes:

frequency-domain resources corresponding to a first monitoring are reserved for PUCCH transmission, and frequency-domain resources corresponding to a second monitoring are reserved for PUSCH transmission; that is, whether the UCI is transmitted in the PUCCH or the PUSCH is judged according to the result of LBT, so as to ensure the performance of UCI.

a value of K1 is defined; when a number of subbands occupied by the PUSCH passing LBT is large (corresponding to a scenario of not less than K1), the UCI is transmitted on the PUSCH to save PUCCH resources; when a number of subbands occupied by the PUSCH passing LBT is small (corresponding to a scenario of less than K1), the UCI is transmitted on the PUCCH to ensure performance of the UCI; furthermore, even if the PUCCH can be transmitted, when the number of subbands passed by the PUSCH is large, the piggybacking mode is still adopted.

the design in the present disclosure does not involve recoding and resources remapping of the UCI according to the result of LBT; the first node generates two UCI coding and mapping schemes for piggybacking mode and non-piggybacking mode respectively according to an uplink grant scheduling the PUSCH and scheduling information of the PDSCH fed back by the UCI; the transmission performance of the UCI is improved without increasing too much complexity of the UE.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
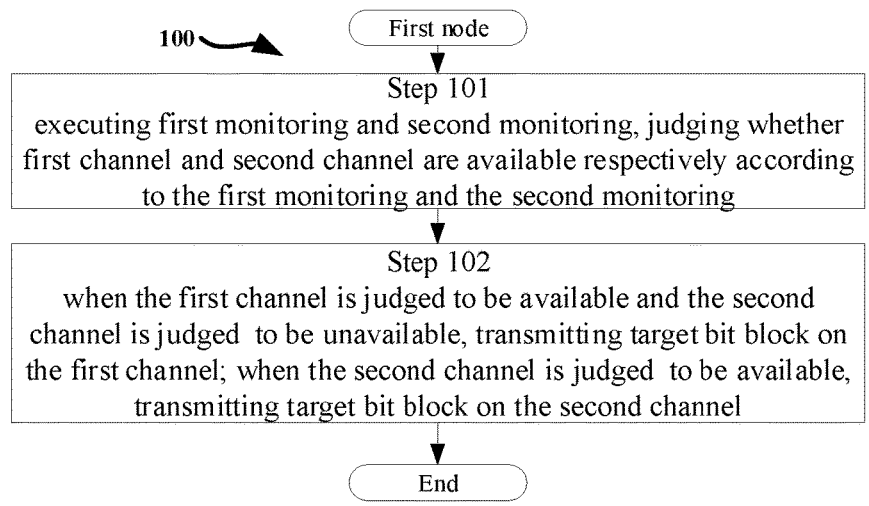
FIG. 1 illustrates a flowchart of the processing of a first node according to one embodiment of the present disclosure.

Embodiment 1 illustrates a processing flowchart of a first node, as shown in FIG. 1. In step 100 illustrated by FIG. 1, each box represents a step. In embodiment 1, the first node in the present disclosure executes a first monitoring and a second monitoring in step 101, and judges whether a first channel and a second channel are available respectively according to the first monitoring and the second monitoring; when the first channel is judged to be available and the second channel is judged to be unavailable in step 102, transmits a target bit block on the first channel; when the second channel is judged to be available, transmits a target bit block on the second channel.

In embodiment 1, the first channel overlaps with the second channel in time domain; the second channel occupies K subbands in frequency domain, K being a positive integer greater than 1; when a number of idle subbands on the second channel is less than K1, the second channel is judged to be unavailable, and when a number of idle subbands on the second channel is not less than K1, the second channel is judged to be available; K1 is a positive integer not greater than K.

In one embodiment, the first channel can be used to transmit data and control information, and the second channel can only be used to transmit control information.

In one embodiment, the second channel can be used to transmit data and control information, and the first channel can only be used to transmit control information.

In one embodiment, the first channel is a PUCCH, and the second channel is a PUSCH.

In one embodiment, a first subband comprises frequency-domain resources reserved for the first channel.

In one subembodiment of the above embodiment, the first subband comprises at least one subcarrier, and the first channel occupies partial or all subcarriers in the first subband.

In one embodiment, frequency-domain resources reserved for the second channel belong to K subbands.

In one embodiment, resources configured for the second channel in frequency domain comprise K sub-bands.

In one subembodiment of the above two embodiments, frequency-domain resources occupied by the second channel are interlaced in the K subbands.

In one subembodiment of the above three embodiments, the first subband and the K subbands are all belong to a Bandwidth Part (BWP).

In one subembodiment of the above three embodiments, the first subband and the K subbands all belong to a carrier.

In one subembodiment of the above three embodiments, the first subband and the K subbands are all belong to a Component Carrier (CC).

In one subembodiment of the above three embodiments, the first subband and the K subbands are all belong to frequency-domain resources deployed by a serving cell.

In one embodiment, the above phrase that the second channel occupies K subbands in frequency domain includes: K Physical Resource Block (PRB) sets are reserved for transmitting the second channel, and frequency-domain resources occupied by the K PRB sets respectively belong to the K subbands.

In one embodiment, the above phrase that the second channel occupies K subbands in frequency domain includes: any of the K subbands at least comprises a PRB occupied by the second channel.

In one embodiment, the above phrase that the second channel occupies K subbands in frequency domain includes: all PRBs comprised in any of the K subbands are occupied by the second channel.

In one embodiment, frequency-domain resources reserved for the first channel and frequency-domain resources reserved for the second channel are both belong to unlicensed spectrum.

In one embodiment, frequency-domain resources occupied by the first channel belong to licensed spectrum, and frequency-domain resources occupied by the second channel belong to unlicensed spectrum.

In one embodiment, the idle subband refers to: the subband is not occupied by a node other than the first node.

In one embodiment, the idle subband refers to: the subband is not occupied by a node other than the second node in the present disclosure.

In one embodiment, the idle subband refers to: the subband is not occupied by a node other than the first node.

In one embodiment, the idle subband refers to: the subband is not occupied by a node other than a given node set, and the given node set comprises the first node and the second node in the present disclosure.

In one subembodiment of the above embodiment, the given node set only comprises the first node and the second node.

In one embodiment, K1 is less than K.

In one embodiment, K1 is equal to K.

In one embodiment, K1 is configured by a higher-layer signaling.

In one embodiment, K1 is fixed.

In one embodiment, a bandwidth of each of the K subbands is the same.

In one embodiment, bandwidths of at least two of the K subbands are different.

In one embodiment, K1 is equal to a product of K and a first coefficient rounded to an integer; the first coefficient is fixed, or the first coefficient is configured by a higher-layer signaling; the first coefficient is equal to X percent, X being a positive integer greater than 0 not greater than 100.

In one embodiment, the above phrase that the first channel overlaps with the second channel in time domain includes: there at least exists one multicarrier symbol belonging to time-domain resources occupied by the first channel and time-domain resources occupied by the second channel at the same time.

In one embodiment, the above phrase that the first channel overlaps with the second channel in time domain includes: the first channel and the second channel occupy at least one same multicarrier symbol.

In one embodiment, the multicarrier symbol in the present disclosure is an Orthogonal Frequency Division Multiplexing (OFDM) symbol.

In one embodiment, the multicarrier symbol in the present disclosure is a Single Carrier-Frequency Division Multiple Access (SC-FDMA) symbol.

In one embodiment, the multicarrier symbol in the present disclosure is a Discrete Fourier Transform Spread OFDM (DFT-S-OFDM) symbol.

In one embodiment, the multicarrier symbol in the present disclosure is a Filter Bank Multi Carrier (FBMC) symbol.

In one embodiment, the multicarrier symbol in the present disclosure comprises a Cyclic Prefix (CP).

In one embodiment, the target bit block comprises UCI.

In one embodiment, the target bit block comprises a Hybrid Automatic Repeat reQuest (HARD) feedback.

In one embodiment, the target bit block comprises Channel State Information (CSI).

In one embodiment, the target bit block is transmitted after through at least one of basic sequence generation, cyclic shift, sequence generation, modulation, time-domain spread spectrum or physical resource mapping.

In one embodiment, the target bit block is transmitted after through at least one of basic sequence generation, cyclic shift, sequence generation, modulation, time-domain spread spectrum or physical resource mapping.

In one embodiment, the target bit block is transmitted after through at least one of coding, scrambling, modulation, Discrete Fourier Transform (DFT) pre-coding or physical resource mapping.

In one embodiment, the target bit block is transmitted after through at least one of coding, scrambling, modulation, DFT precoding or physical resource mapping.

In one embodiment, the target bit block is transmitted through channel coding.

In one embodiment, the target bit block is not through channel coding before being transmitted.

In one embodiment, when the first channel and the second channel are both judged to be unavailable, the target bit block is delayed to be transmitted.

In one embodiment, when the first channel and the second channel are both judged to be unavailable, the target bit block is dropped to be transmitted.

In one embodiment, the target bit block comprises 1 bit.

In one embodiment, the target bit block comprises a plurality of bits.

In one embodiment, frequency-domain resources occupied by the first channel belong to a first subband, and the first monitoring is executed in the first subband.

In one subembodiment of the above embodiment, the first monitoring is a Listen Before Talk (LBT).

In one subembodiment of the above embodiment, the first monitoring is a Clear Channel Assessment (CCA).

In one subembodiment of the above embodiment, the first monitoring is performed on the first subband.

In one subembodiment of the above embodiment, the first monitoring is performed on a first frequency-domain interval, and the first frequency-domain interval comprises the first subband.

In one embodiment, frequency-domain resources occupied by the second channel belong K subbands, and the second monitoring is executed in the K subbands.

In one subembodiment of the above embodiment, the second monitoring is an LBT.

In one subembodiment of the above embodiment, the second monitoring is a CCA.

In one subembodiment of the above embodiment, the second monitoring is performed on the K subbands.

In one subembodiment of the above embodiment, the second monitoring is performed on a first frequency-domain interval, and the first frequency-domain interval comprises the K subbands.

In one embodiment, the first frequency-domain interval in the present disclosure is a CC, or the first frequency-domain interval in the present disclosure is a BWP.

In one embodiment, the first monitoring and the second monitoring are executed simultaneously.

In one embodiment, the first monitoring is a Subband LBT, or the first monitoring is a Subband CCA.

In one embodiment, the second monitoring is a Subband LBT, or the second monitoring is a Subband CCA.

In one embodiment, the first monitoring is a Wideband LBT.

In one embodiment, the second monitoring is a Wideband LBT.

In one embodiment, the first monitoring is a Wideband CCA.

In one embodiment, the second monitoring is a Wideband CCA.

In one embodiment, a bandwidth of the first subband is not greater than 20 MHz.

In one embodiment, a bandwidth of any of the K subbands is not greater than 20 MHz.

In one embodiment, a bandwidth corresponding to the first monitoring is a positive integral multiple of 20 MHz.

In one embodiment, a bandwidth corresponding to the second monitoring is a positive integral multiple of 20 MHz.

In one embodiment, the first channel in the present disclosure is judged to be available includes: frequency-domain resources occupied by the first channel is determined as not being occupied through the first monitoring.

In one embodiment, the first channel in the present disclosure is judged to be unavailable includes: frequency-domain resources occupied by the first channel is determined as being occupied through the first monitoring.

In one embodiment, both the first channel and the second channel are judged to be available, and the target bit block is transmitted in the second channel.

Embodiment 2

Figure 2:
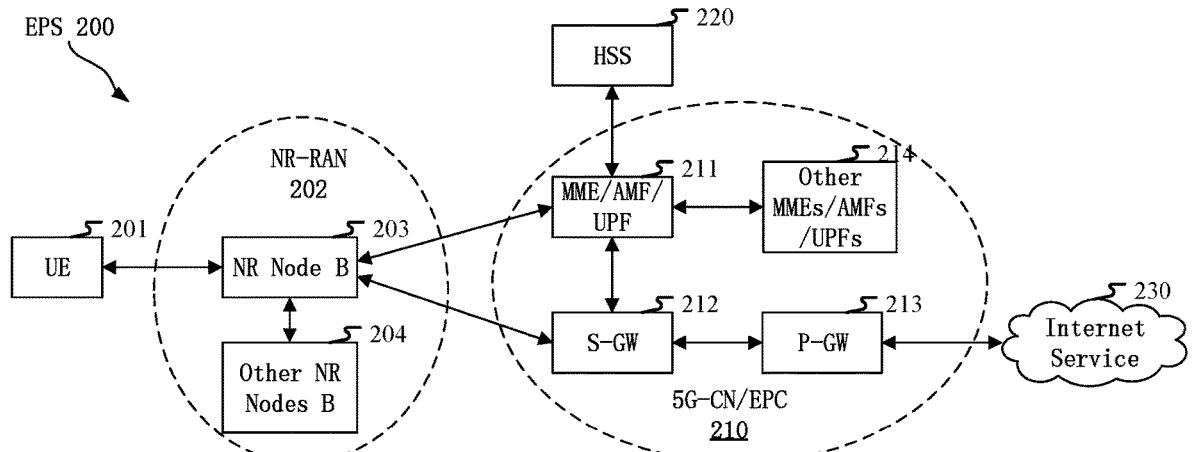
FIG. 2 illustrates a schematic diagram of a network architecture according to one embodiment of the present disclosure.

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the gNB 203 corresponds to the second node in the present disclosure.

In one embodiment, a radio interface between the UE 201 and the gNB 203 is a Uu interface.

In one embodiment, a radio link between the UE 201 and the gNB 203 is a cellular network link.

In one embodiment, the first node in the present disclosure is the UE 201, and the second node in the present disclosure is the gNB 203.

In one embodiment, the first node in the present disclosure is the gNB 203, and the second node in the present disclosure is the UE 201.

In one embodiment, the UE 201 supports simultaneous LBTs in a plurality of BWPs.

In one embodiment, the gNB 203 supports simultaneous LBTs in a plurality of BWPs.

In one embodiment, the UE 201 supports simultaneous LBTs in a plurality of subbands.

In one embodiment, the gNB 203 supports simultaneous LBTs in a plurality of subbands.

In one embodiment, the UE 201 supports LBT of subband.

In one embodiment, the gNB 203 supports LBT of subband.

In one embodiment, the UE 201 supports LBT of wideband.

In one embodiment, the gNB 203 supports LBT of wideband.

Embodiment 3

Figure 3:
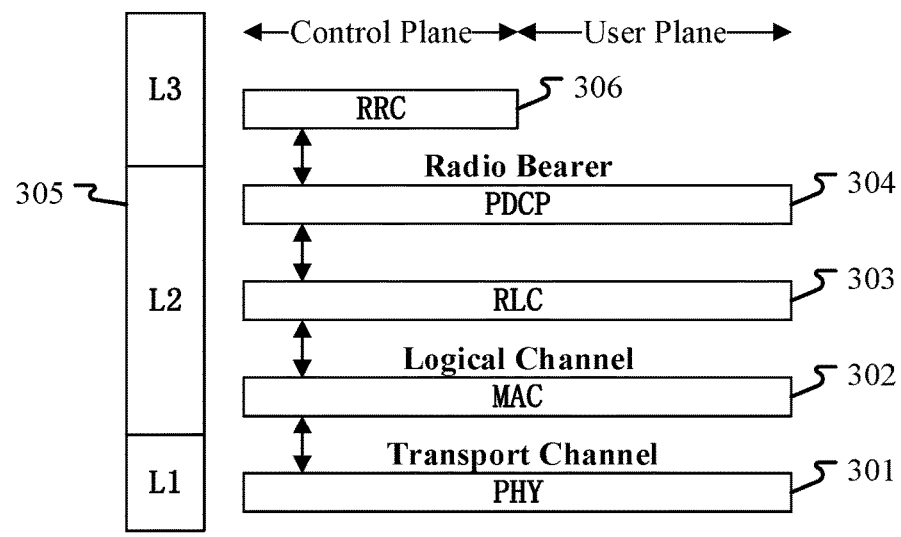
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a first node and a second node is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node of the network side. Although not described in FIG. 3, the first node may comprise several higher layers above the L2 layer 305, such as a network layer (e.g., IP layer) terminated at a P-GW of the network side and an application layer terminated at the other side of the connection (e.g., a peer UE, a server, etc.). The PDCP sublayer 304 provides multiplexing among variable radio bearers and logical channels. The PDCP sublayer 304 also provides a header compression for a higher-layer data packet so as to reduce a radio transmission overhead. The PDCP sublayer 304 provides security by encrypting a packet and provides support for UE handover between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane, the radio protocol architecture of the first node and the second node is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for obtaining radio resources (i.e., radio bearer) and configuring the lower layer using an RRC signaling between the second node and the first node.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the target bit block in the present disclosure is generated by the PHY 301.

In one embodiment, the target bit block in the present disclosure is generated by the MAC sublayer 302.

In one embodiment, the first radio signal in the present disclosure is generated by the PHY 301.

In one embodiment, the first radio signal in the present disclosure is generated by the MAC sublayer 302.

In one embodiment, the first signaling in the present disclosure is generated by the PHY 301.

In one embodiment, the first signaling in the present disclosure is generated by the PHY 301.

In one embodiment, the target radio signal in the present disclosure is generated by the PHY 301.

In one embodiment, the target radio signal in the present disclosure is generated by the MAC sublayer 302.

In one embodiment, the second signaling in the present disclosure is generated by the PHY 301.

Embodiment 4

Figure 4:
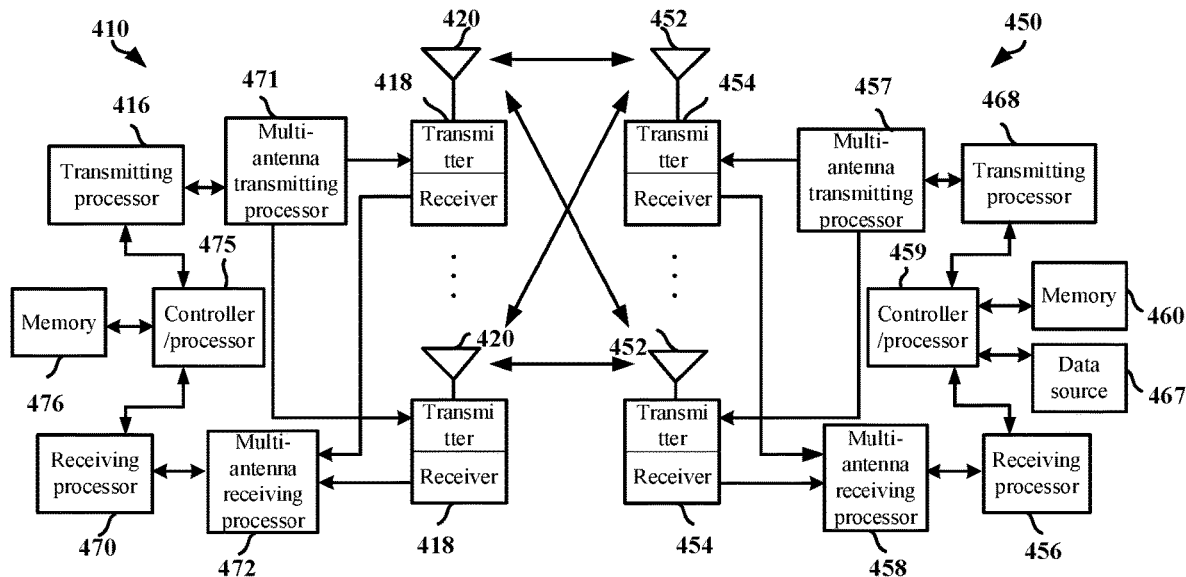
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least first executes a first monitoring and a second monitoring, judges whether a first channel and a second channel are available according to the first monitoring and the second monitoring respectively; then, when the first channel is judged to be available and the second channel is judged to be unavailable, transmits a target bit block on the first channel; when the second channel is judged to be available, transmits a target bit block on the second channel; the first channel overlaps with the second channel in time domain; the second channel occupies K subbands in frequency domain, K being a positive integer greater than 1; when a number of idle subbands on the second channel is less than K1, the second channel is judged to be unavailable, and when a number of idle subbands on the second channel is not less than K1, the second channel is judged to be available; K1 is a positive integer not greater than K.

In one embodiment, the first communication device 450 comprises at least one processor and at least one memory. a memory that stores a computer readable instruction program. The computer readable instruction program generates an action when executed by at least one processor. The action includes: first executing a first monitoring and a second monitoring, judging whether a first channel and a second channel are available according to the first monitoring and the second monitoring respectively; when the first channel is judged to be available and the second channel is judged to be unavailable, transmitting a target bit block on the first channel; and when the second channel is judged to be available, transmitting a target bit block on the second channel; the first channel overlaps with the second channel in time domain; the second channel occupies K subbands in frequency domain, K being a positive integer greater than 1; when a number of idle subbands on the second channel is less than K1, the second channel is judged to be unavailable, and when a number of idle subbands on the second channel is not less than K1, the second channel is judged to be available; K1 is a positive integer not greater than K.

In one embodiment, the second communication device 410 comprises at least one processor and at least one memory. The at least one memory comprises computer program codes; the at least one memory and the computer program codes are configured to be used in collaboration with the at least one processor. The second communication device 410 at least detects a target bit block in both a first channel and a second channel; the first channel overlaps with the second channel in time domain; the second channel occupies K subbands in frequency domain, K being a positive integer greater than 1; a transmitter of the target bit block is a first node, the first node executes a first monitoring and a second monitoring, and judges whether a first channel and a second channel are available respectively according to the first monitoring and the second monitoring; when a number of idle subbands on the second channel is less than K1, the second channel is judged to be unavailable, and the first node transmits a target bit block on the first channel; when a number of idle subbands on the second channel is not less than K1, the second channel is judged to be available, and the first node transmits a target bit block on the second channel; K1 is a positive integer not greater than K.

In one embodiment, the second communication device 410 comprises a memory that stores a computer readable instruction program. The computer readable instruction program generates an action when executed by at least one processor. The action includes: detecting a target bit block in both a first channel and a second channel; the first channel overlaps with the second channel in time domain; the second channel occupies K subbands in frequency domain, K being a positive integer greater than 1; a transmitter of the target bit block is a first node, the first node executes a first monitoring and a second monitoring, and judges whether a first channel and a second channel are available respectively according to the first monitoring and the second monitoring; when a number of idle subbands on the second channel is less than K1, the second channel is judged to be unavailable, and the first node transmits a target bit block on the first channel; when a number of idle subbands on the second channel is not less than K1, the second channel is judged to be available, and the first node transmits a target bit block on the second channel; K1 is a positive integer not greater than K.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the second communication device 410 is a base station.

In one embodiment, at least one of the antenna 452, the receiver 454, the multi-antenna receiving processor 458, the receiving processor 456 or the controller/processor 459 is used to execute a first monitoring and a second monitoring, and judge whether a first channel and a second channel are available respectively according to the first monitoring and the second monitoring.

In one embodiment, when the first channel is judged to be available and the second channel is judged to be unavailable, at least one of the antenna 452, the transmitting processor 454, the multi-antenna transmitting processor 457, the transmitting processor 468, or the controller/processor 459 is used to transmit a target bit block on the first channel; when the second channel is judged to be available, at least one of the antenna 452, the transmitting processor 454, the multi-antenna transmitting processor 457, the transmitting processor 468, or the controller/processor 459 is used to transmit a target bit block on the second channel.

In one embodiment, at least one of the antenna 420, the receiving 418, the multi-antenna receiving processor 472, the receiving processor 470, or the controller/processor 475 is used to detect a target bit block in a first channel and a second channel.

In one embodiment, at least one of the antenna 452, the transmitter 454, the multi-antenna transmitting processor 457, the transmitting processor 468, or the controller/processor 459 is used to transmit a first radio signal in K2 subband(s) in the K subbands; at least one of the antenna 420, the receiver 418, the multi-antenna receiving processor 472, the receiving processor 470 or the controller/processor 475 is used to detect a radio signal generated by a first bit block in the K subbands.

In one embodiment, at least one of the antenna 452, the receiver 454, the multi-antenna receiving processor 458, the receiving processor 456 or the controller/processor 459 is used to receive a first signaling and a target radio signal; at least one of the antenna 420, the transmitter 418, the multi-antenna transmitting processor 471, the transmitting processor 416 or the controller/processor 475 is used to transmit a first signaling and a target radio signal.

In one embodiment, at least one of the antenna 452, the receiver 454, the multi-antenna receiving processor 458, the receiving processor 456 or the controller/processor 459 is used to receive a second signaling; at least one of the antenna 420, the transmitter 418, the multi-antenna transmitting processor 471, the transmitting processor 416 or the controller/processor 475 is used to transmit a second signaling.

Embodiment 5

Figure 5:
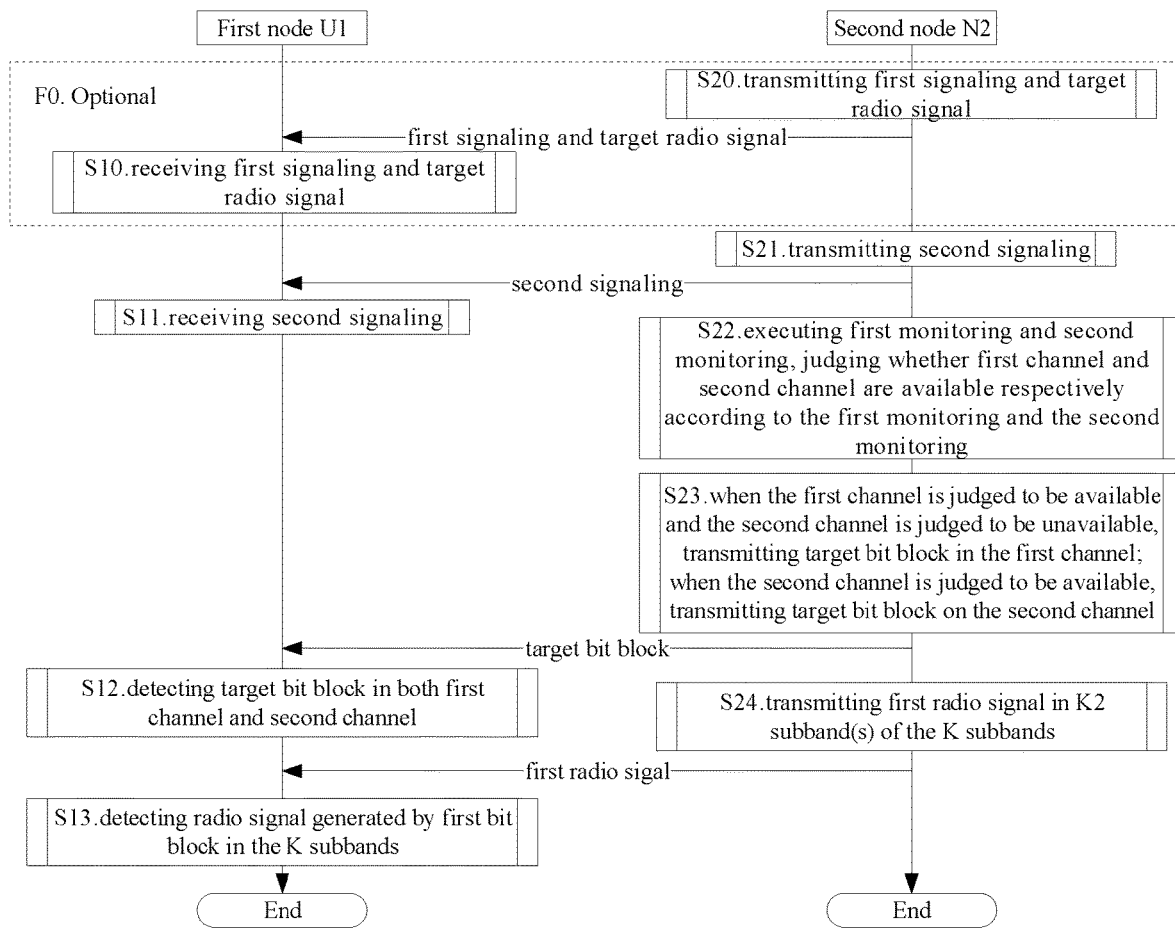
FIG. 5 illustrates a flowchart of a first radio signal according to one embodiment of the present disclosure.

Embodiment 5 illustrates a flowchart of a first radio signal, as shown in FIG. 5. In FIG. 5, a first node U1 and a second node U2 are in communications via an air interface. A part in the figure marked by F0 is optional.

The first node U1 receives a first signaling and a target radio signal in step S10; receives a second signaling in step S11; executes a first monitoring and a second monitoring in step S12, judges whether a first channel and a second channel are available respectively according to the first monitoring and the second monitoring; when the first channel is judged to be available and the second channel is judged to be unavailable in step 13, transmits a target bit block on the first channel; when the second channel is judged to be available, transmits a target bit block on the first channel; and transmits a first radio signal in K2 subband(s) of the K subbands in step S14.

The second node N2 transmits a first signaling and a target radio signal in step S20; transmits a second signaling in step S21; detects a target bit block in both a first channel and a second channel in step S22; and detects a radio signal generated by a first bit block in the K subbands in step S23.

In embodiment 5, the first channel overlaps with the second channel in time domain; the second channel occupies K subbands in frequency domain, K being a positive integer greater than 1; when a number of idle subbands on the second channel is less than K1, the second channel is judged to be unavailable, and when a number of idle subbands on the second channel is not less than K1, the second channel is judged to be available; K1 is a positive integer not greater than K; the K2 subband(s) on the second channel is(are) judged to be idle in the second monitoring; K2 is a positive integer less than K; the first signaling is used to determine at least one of time-domain resources occupied by the target radio signal or frequency-domain resources occupied by the target radio signal; the target bit block is used to determine whether the target radio signal is correctly received; the second signaling is used to determine a first frequency-domain resource set, the first frequency-domain resource set comprises K frequency-domain resource subsets, and the K frequency-domain resource subsets are located in the K subbands respectively; a first bit block is used to generate the first radio signal; and the K frequency-domain resource subsets are reserved for transmitting the first bit block.

In one embodiment, K2 is less than K1, the second channel is judged to be unavailable, the first node U1 transmits the first radio signal in the K2 subband(s) of the K subbands, and the first node U1 transmits the target bit block on the first channel.

In one subembodiment of the above embodiment, the first radio signal does not comprise partial or all bits comprised in the target bit block.

In one embodiment, K2 is not less than K1, the second channel is judged to be available, the first node U1 transmits the first radio signal in the K2 subband(s) of the K subbands, and the first radio signal comprises partial or all bits comprised in the target bit block.

In one embodiment, the first radio signal comprises first data.

In one embodiment, a transmission channel corresponding to the first radio signal is an Uplink Shared Channel (UL-SCH).

In one embodiment, the first bit block is used to generate the first radio signal.

In one embodiment, the first bit block is transmitted after successively through at least one of Cyclic Redundancy Check (CRC) Attachment, Low Density Parity Check Code (LDPC) coding, Rate Matching, Scrambling, modulation, Layer Mapping, Transform Precoding, Multi-antenna precoding, Resource mapping or Physical antenna mapping.

In one embodiment, the first bit block is transmitted after successively through at least one of CRC Attachment, LDPC coding, Rate Matching, Scrambling, modulation, Layer Mapping, Transform Precoding, Multi-antenna precoding, Resource mapping or Physical antenna mapping.

In one embodiment, a first radio signal is generated after the first bit block successively through at least one of CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation or Modulation and Upconversion.

In one embodiment, a first radio signal is generated after the first bit block through at least one of CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation or Modulation and Upconversion.

In one embodiment, any of the K2 subband(s) is one of the K subbands.

In one embodiment, a scheduling signaling of the first radio signal is used to schedule a radio signal generated by the first bit block to be transmitted on the K subbands.

In one embodiment, the first bit block is used to generate K sub-radio signals, the K subbands are respectively reserved for transmitting the K sub-radio signals, and the first radio signal only comprises K2 sub-radio signal(s) scheduled to be transmitted in the K2 subband(s) in the K sub-radio signals.

In one subembodiment of the above embodiment, a sub-radio signal other than the K2 sub-radio signal(s) in the K sub-radio signals is delayed to be transmitted.

In one subembodiment of the above embodiment, a sub-radio signal other than the K2 sub-radio signal(s) in the K sub-radio signals is dropped to be transmitted.

In one embodiment, the second channel is judged to be available, the target bit block is used to generate a first radio sub-signal, and the first radio signal comprises the first radio sub-signal.

In one subembodiment of the above embodiment, the second channel is judged to be available, the target bit block is used to generate the first radio sub-signal, and the first radio signal comprises the first radio sub-signal.

In one subembodiment of the above embodiment, the first radio sub-signal is UCI Piggyback on PUSCH.

In one subembodiment of the above embodiment, a modulation symbol comprised in the first radio sub-signal is mapped into time-frequency resources occupied by the first radio signal through rate matching.

In one subembodiment of the above embodiment, a modulation symbol comprised in the first radio sub-signal is mapped into time-frequency resources occupied by the first radio signal through puncturing.

In one subembodiment of the above embodiment, a modulation symbol comprised in the first radio sub-signal is mapped into time-frequency resources occupied by the first radio signal through rate matching or puncturing.

In one subembodiment of the above embodiment, the first radio signal only comprises the first radio sub-signal.

In one subembodiment of the above embodiment, the first radio signal comprises the first radio sub-signal and a second radio sub-signal, and the first bit block in the present disclosure is used to generate the second radio sub-signal.

In one subembodiment of the above embodiment, the first node U1 transmits K2 second-type bit sub-block(s) respectively in the K2 subband(s) on the second channel, and a bit comprised in any of the K2 second-type bit sub-block(s) belongs to the target bit block.

In one subsidiary embodiment of the above subembodiment, the target bit block comprises K second-type bit sub-blocks, the K second-type bit sub-blocks are respectively mapped into the K subbands, and the K2 second-type bit sub-block(s) in the K second-type bit sub-blocks is(are) transmitted by the first node U1.

In one subsidiary embodiment of the above subembodiment, a target modulation symbol set is obtained after the target bit block is through channel coding and modulation, the target modulation symbol set is mapped into the K subbands of the second channel, and the first radio sub-signal comprises modulation symbol(s) mapped into the K2 subband(s) in the target modulation symbol set; modulation symbol(s) mapped outside the K2 subband(s) in the target modulation set is(are) dropped.

In one embodiment, the first signaling is Downlink Control Information (DCI).

In one embodiment, the first signaling is a DL Grant.

In one embodiment, a physical-layer channel occupied by the target radio signal is a Physical Downlink Shared Channel (PDSCH).

In one embodiment, a transmission channel occupied by the target radio signal is a Downlink Shared Channel (DL-SCH).

In one embodiment, the second signaling is DCI.

In one embodiment, the second signaling is a UL Grant.

In one embodiment, the first bit block is used to generate a PUSCH.

In one embodiment, the first bit block is used to generate a UL-SCH.

In one embodiment, the second signaling is used to schedule K sub-radio signals, and the K sub-radio signals consist of a PUSCH.

In one subembodiment of the above embodiment, the K frequency-domain resource subsets are respectively reserved for transmitting the K sub-radio signals.

In one subembodiment of the above embodiment, the K sub-radio signals are respectively scheduled into the K frequency-domain resource subsets.

In one subembodiment of the above embodiment, the second monitoring is used to determine that K2 subband(s) in the K subbands is(are) idle, and K2 sub-radio signal(s) in the K2 subband(s) consists(consist) of the first radio signal in the present disclosure.

In one embodiment, any of the K frequency-domain resource subsets comprises frequency-domain resources corresponding to at least one PRB in frequency domain.

In one embodiment, the second node N2 does not know in which of the first channel or the second channel the target bit block is transmitted before detecting the target bit block.

In one embodiment, the detecting the target bit block includes: receiving the target bit block.

In one embodiment, the detecting the target bit block includes: blindly detecting the target bit block.

In one subembodiment of the above embodiment, the blindly detecting the target bit block includes: the second node N2 does not know which Resource Elements (REs) are occupied by a radio signal generated by the target bit block before detecting the target bit block.

In one subembodiment of the above embodiment, the blindly detecting the target bit block includes: the second node N2 determines whether the target bit block is correctly received through a CRC carried by a radio signal generated by the target bit block.

In one subembodiment of the above embodiment, the blindly detecting the target bit block includes: the second node N2 determines which REs are occupied by a radio signal generated by the target bit block through energy detection.

In one subembodiment of the above embodiment, the blindly detecting the target bit block includes: the second node N2 determines whether the target bit block is correctly received through coherent detection.

In one subembodiment of the above embodiment, the blindly detecting the target bit block includes: the second node N2 determines whether the target bit block is correctly received through sequence detection.

In one subembodiment of the above embodiment, the meaning of the blind detection includes: the second node N2 determines in which of the first channel or the second channel the target bit block is transmitted through energy detection.

In one embodiment, the detecting a radio signal generated by a first bit block includes: receiving a radio signal generated by the first bit block.

In one embodiment, the detecting a radio signal generated by a first bit block includes: blindly detecting a radio signal generated by the first bit block.

In one subembodiment of the above embodiment, the blindly detecting a radio signal generated by the first bit block includes: the second node N2 does not know in which subbands of the K subbands a radio signal generated by the first bit block is transmitted before detecting a radio signal generated by a first bit block.

In one subembodiment of the above embodiment, the blindly detecting a radio signal generated by the first bit block includes: the second node N2 determines whether the first bit block is correctly received through a CRC carried by a radio signal generated by the first bit block.

In one subembodiment of the above embodiment, the blindly detecting a radio signal generated by the first bit block includes: the second node N2 determines which REs are occupied by a radio signal generated by the target bit block through energy detection.

In one subembodiment of the above embodiment, the blindly detecting a radio signal generated by the first bit block includes: the second node N2 determines whether the first bit block is correctly received through coherent detection.

In one subembodiment of the above embodiment, the blindly detecting a radio signal generated by the first bit block includes: the second node N2 determines whether the first bit block is correctly received through sequence detection.

In one embodiment, the first bit block comprises K first-type bit sub-blocks, the K first-type bit sub-blocks are used to generate K sub-radio signals, and the K subbands are respectively used for transmitting the K sub-radio signals.

In one subembodiment of the above embodiment, the K first-type bit sub-blocks generate K Code Block Groups (CBG) respectively.

In one subembodiment of the above embodiment, the first bit block generates a Transmission Block (TB).

Embodiment 6

Figure 6:
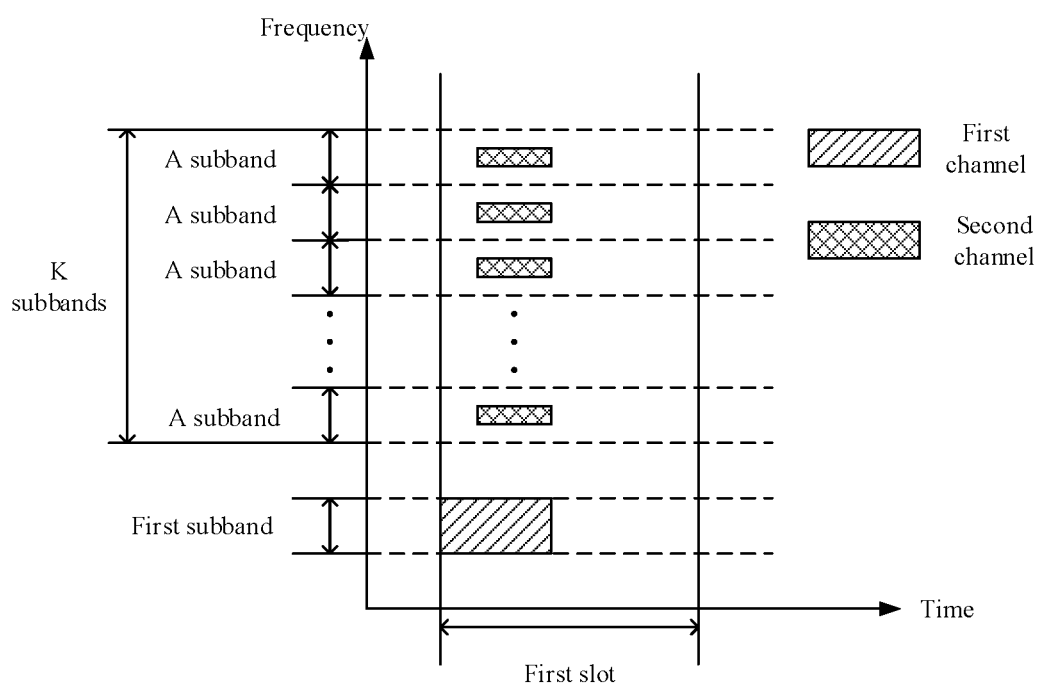
FIG. 6 illustrates a schematic diagram of a first channel and a second channel according to one embodiment of the present disclosure.

Embodiment 6 illustrates a schematic diagram of a first channel and a second channel, as shown in FIG. 6. In FIG. 6, frequency-domain resources occupied by the first channel belong to a first subband, and frequency-domain resources occupied by the second channel belong to K subbands; time-domain resources respectively occupied by the first channel and the second channel both belong to a first slot, and time-domain resources respectively occupied by the first channel and the second channel are overlapped in time domain.

In one embodiment, the first subband and any of the K subbands occupy a same number of PRBs in frequency domain.

In one embodiment, any of the K subbands occupies a same number of PRBs in frequency domain.

In one embodiment, a subcarrier in the first subband and a subcarrier in any of the K subbands respectively adopt different subcarrier spacings (SCSs).

In one embodiment, the first subband is a BWP.

In one embodiment, the K subbands respectively correspond to K BWPs.

In one embodiment, a frequency-domain bandwidth occupied by the first subband is not greater than 20 MHz.

In one embodiment, a frequency-domain bandwidth occupied by any of the K subbands is not greater than 20 MHz.

In one embodiment, the first node in the present disclosure executes channel monitoring in the first subband and the K subbands simultaneously to determine whether the first subband is idle and which of the K subbands are idle.

Embodiment 7

Figure 7:
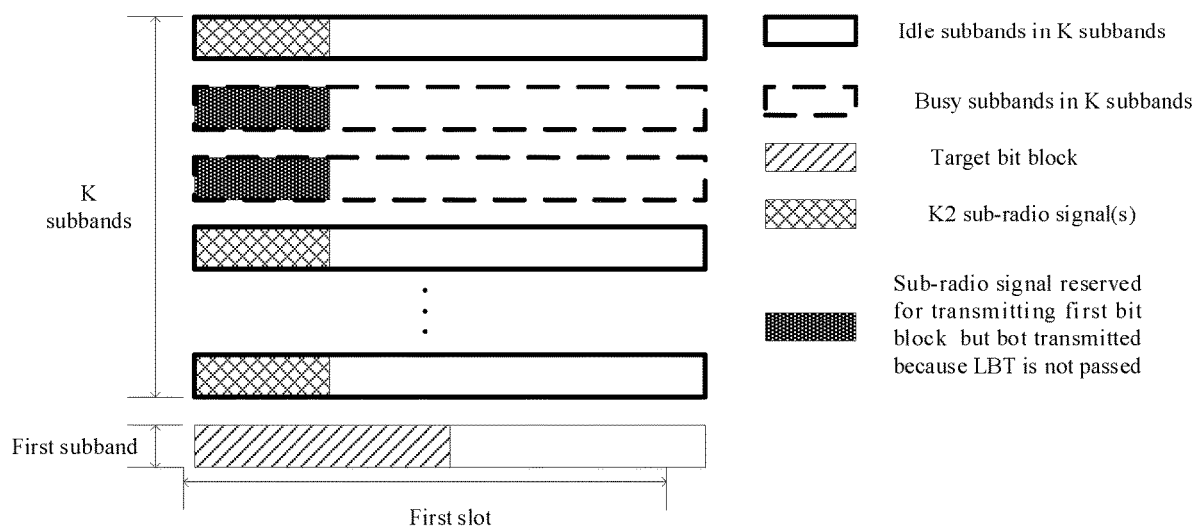
FIG. 7 illustrate a schematic diagram of a first radio signal and a target bit block according to another embodiment of the present disclosure.

Embodiment 7 illustrates a schematic diagram of a first radio signal and a target bit block, as shown in FIG. 7. In FIG. 7, when the first channel is judged by the first node in the present disclosure to be available and the second channel is judged by the first node in the present disclosure to be unavailable, the first node transmits a target bit block on the first channel; frequency-domain resources occupied by a first channel in the figure belong to a first subband, K2 subband(s) in the K subbands in the figure is judged to be idle in the first slot, and the first radio signal is transmitted in the K2 subband(s); the K sub-radio signals shown in the figure are generated by the first bit block in the present disclosure, the K sub-radio signals are mapped into K subbands respectively, and K2 sub-radio signal(s) mapped into the K2 subband(s) in the K sub-radio signals consists (consists) of the first radio signal.

In one embodiment, the first bit block is used to generate the K sub-radio signals, and the K2 sub-radio signal(s) only comprises(comprise) partial bits of the first bit block.

In one embodiment, the K sub-radio signals correspond to K CBGs respectively.

In one subembodiment of the above embodiment, the K2 sub-radio signal(s) corresponds(respectively correspond) to K2 CBG(s) in the K CBGs respectively.

In one subsidiary embodiment of the subembodiment, the K2 CBG(s) is(are respectively) transmitted in the K2 sub-band(s).

In one subembodiment of the above embodiment, the K CBGs comprise K identifiers respectively, the K CBGs are identified as CBG #1 to CBG #K respectively, and the CBG #1 to the CBG #K are mapped into the K subbands according to frequency in ascending order.

In one subembodiment of the above embodiment, the K CBGs comprise K identifiers respectively, the K CBGs are identified as CBG #1 to CBG #K respectively, and the CBG #1 to the CBG #K are mapped into the K subbands according to frequency in descending order.

Embodiment 8

Figure 8:
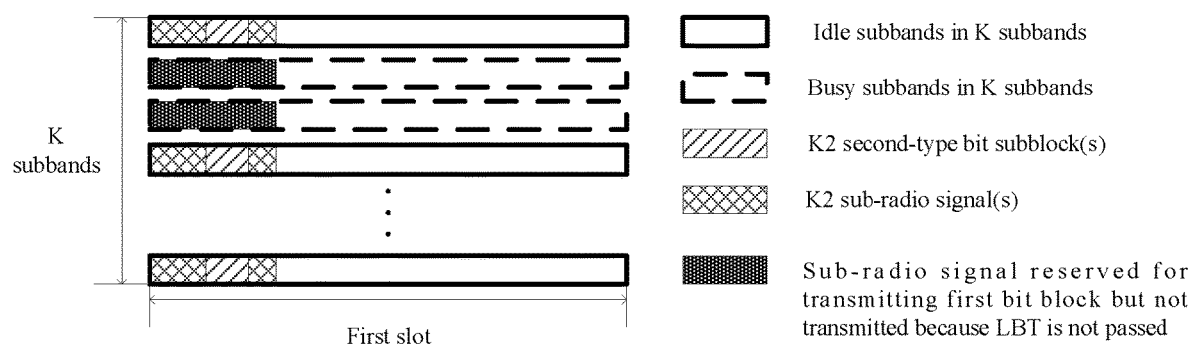
FIG. 8 illustrate a schematic diagram of a first radio signal and a target bit block according to another embodiment of the present disclosure.

Embodiment 8 illustrates another schematic diagram of a first radio signal and a target bit block, as shown in FIG. 8. In FIG. 8, the second channel is judged by the first node to be available, and the first node transmits a target bit block on the second channel; K2 subband(s) in the K subbands in the figure is(are) judged to be idle in the first slot, and the first radio signal is transmitted in the K2 subband(s); the K sub-radio signals in the figure are generated by the first bit block in the present disclosure, the K sub-radio signals are mapped into K subbands respectively, and K2 sub-radio signal(s) mapped into the K2 subband(s) in the K sub-radio signals consists(consist) of the first radio signal; the target bit block in the present disclosure is used to generate K2 second-type bit sub-block(s), the first radio signal comprises K2 sub-radio signal(s), and the K2 second-type sub-block(s) is(are respectively) transmitted in the K2 sub-radio signal(s).

In one embodiment, the target bit block comprises K second-type bit sub-blocks, the K second-type bit sub-blocks are respectively mapped into the K subbands, and K2 second-type bit sub-block(s) in the K second-type bit sub-blocks is(are respectively) mapped into the K2 subband(s) in the K subbands.

In one embodiment, the K sub-radio signals correspond to K CBGs respectively.

In one subembodiment of the above embodiment, the K2 sub-radio signal(s) corresponds(respectively correspond) to K2 CBG(s) in the K CBGs.

In one subsidiary embodiment of the subembodiment, the K2 CBG(s) is(are respectively) transmitted in the K2 sub-band(s).

In one subembodiment of the above embodiment, the K CBGs comprise K identifiers respectively, the K CBGs are identified as CBG #1 to CBG #K respectively, and the CBG #1 to the CBG #K are mapped into the K subbands according to frequency in ascending order.

In one subembodiment of the above embodiment, the K CBGs comprise K identifiers respectively, the K CBGs are identified as CBG #1 to CBG #K respectively, and the CBG #1 to the CBG #K are mapped into the K subbands according to frequency in descending order.

Embodiment 9

Figure 9:
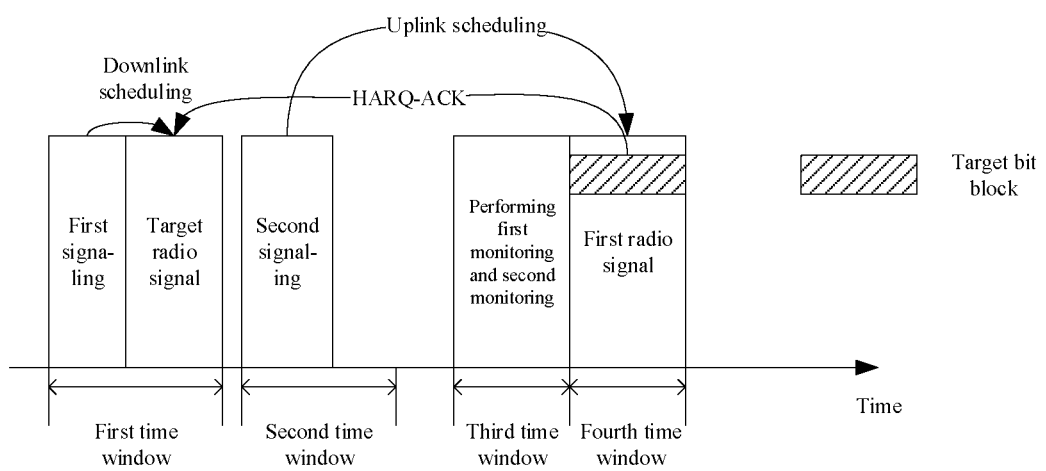
FIG. 9 illustrates a schematic diagram of a timing relation according to one embodiment of the present disclosure.

Embodiment 9 illustrates a schematic diagram of a timing relation, as shown in FIG. 9. In FIG. 9, a first time window, a second time window, a third time window and a fourth time window are arranged in order according to time domain in the figure; the first node receives a first signaling and a target radio signal in the first time window, receives a second signaling in a second time window, and transmits a target bit block and a first radio signal in a fourth time window; the first node executes a first monitoring and a second monitoring in the present disclosure in a third time window; and the third time window and the fourth time window are consecutive in time domain.

In one embodiment, the first signaling is DCI, the target radio signal is a PDSCH scheduled by the first signaling, and the target bit block is used to generate an HARQ-ACK for the target radio signal.

In one embodiment, the second signaling and the first radio signal are respectively DCI and a PUSCH scheduled by the DCI.

In one embodiment, the first signaling is used to determine that an HARQ-ACK for the target radio signal is transmitted in the fourth time window, and the second signaling is used to determine that the first radio signal is transmitted in the fourth time window.

Embodiment 10

Figure 10:
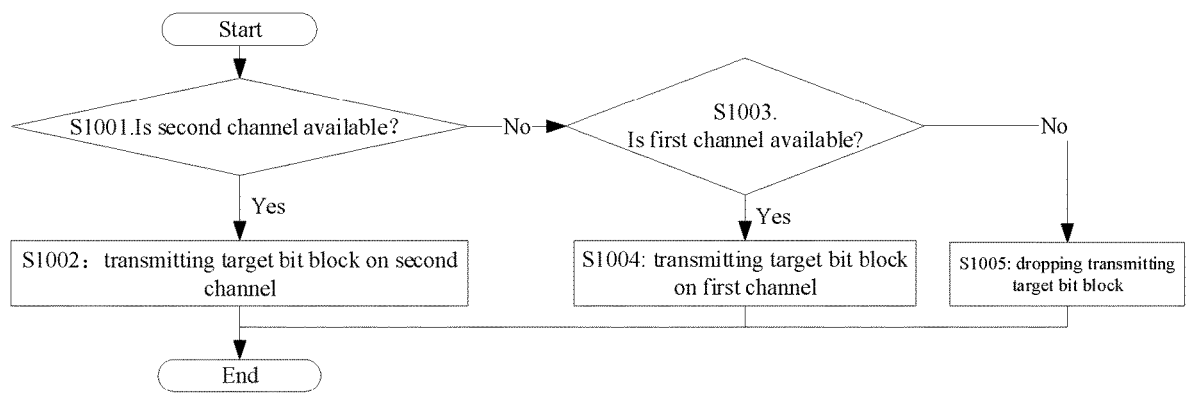
FIG. 10 illustrates a flowchart of a first monitoring and a second monitoring and subsequent actions according to one embodiment of the present disclosure.

Embodiment 10 illustrates a flowchart of a first monitoring and a second monitoring and subsequent actions, as shown in FIG. 10. A first node judges whether a second channel is available in step S1001; if yes, transmits a target bit block on a second channel in step S1002; if no, judges whether a first channel is available in step S1003; if yes, transmits a target bit block on a first channel in step S1004; if no, drops transmitting a target bit block in step S1005.

In one embodiment, the step S1005 includes: maintaining zero transmit power on frequency-domain resources occupied by the first channel.

In one embodiment, the step S1005 includes: caching an information bit corresponding to the target bit block and waiting for a next transmission opportunity.

In one embodiment, the step S1005 includes: continuing executing a channel sensing operation to determine time-frequency resources that can be used to transmit an information bit corresponding to the target bit block.

Embodiment 11

Figure 11:
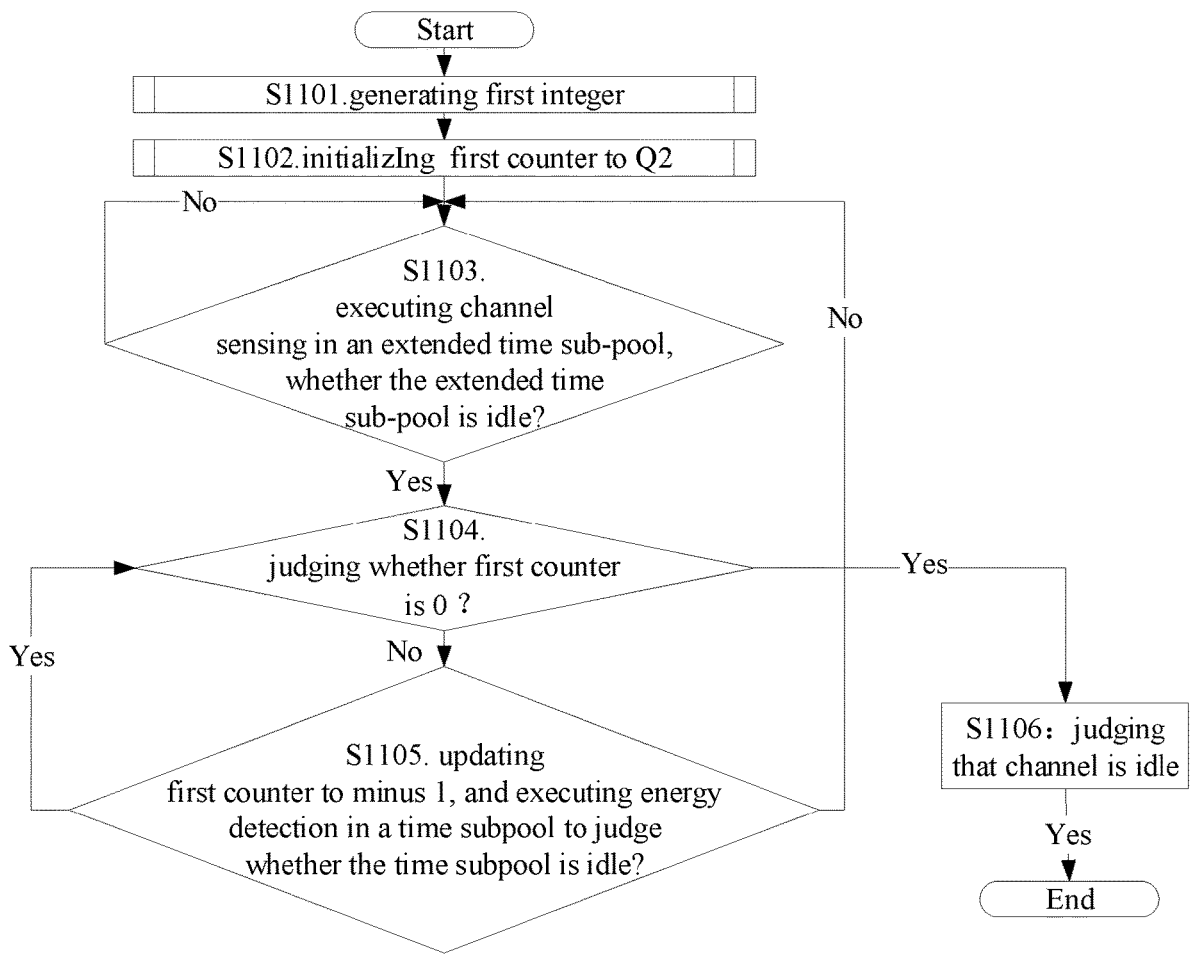
FIG. 11 illustrates a schematic diagram of executing a given monitoring to judge whether a given channel is idle according to one embodiment of the present disclosure.

Embodiment 11 illustrates a flowchart of executing a given monitoring to judge whether a given channel is idle, as shown in FIG. 11. The step shown in FIG. 10 is a monitoring executed on a given frequency-domain resource to judge whether a channel on a given frequency-domain resource is idle.

The given node in the present disclosure generates a first integer in step S1101; initializes a first counter to Q2 in step S102, and a distribution probability of Q2 is uniform among all integers between 0 and the first integer; in step S1103, executes a channel sensing in an extended time sub-pool to judge whether the extended time sub-pool is idle, if no, continues to execute a channel sensing in an extended time sub-pool until an idle extended time sub-pool is found; if yes, judges whether the first counter is 0 in step S1104; if the result in step S1104 is yes, judges that the channel is idle in step S1106; if the result in step S1104 is no, updates a first counter to minus 1 in step S105 (that is, a value of the first counter after being updated=a value of the first counter before being updated−1), executes an energy detection in a time sub-pool to judge whether the time sub-pool is idle; if the result in step S1105 is yes, skips to the step S1104; if the result in step S1105 is no, skips to step S1103, that is, executes an energy detection until an extended time sub-pool is considered to be idle.

In one embodiment, the given monitoring is the first monitoring in the present disclosure, and the given frequency-domain resources comprise frequency-domain resources occupied by the first channel in the present disclosure.

In one embodiment, the given monitoring is the second monitoring in the present disclosure, and the given frequency-domain resources comprise frequency-domain resources occupied by the second channel in the present disclosure.

In one embodiment, the given monitoring is the second monitoring in the present disclosure, and the given frequency-domain resources comprise any of K subbands occupied by the second channel in the present disclosure.

In one embodiment, in the channel sensing executed in a first time sub-pool, the first time sub-pool is assumed idle, and the first time sub-pool is an earliest one of the Q1 time sub-pools; Q2 is greater than 0; the Q2 time sub-pools is(are) Q1-1 time sub-pool(s) other than the first time sub-pool in the Q1 time sub-pools.

In one embodiment, the first node executes Q1 energy detections in the Q1 time sub-pools respectively, and the Q1 energy detections are used to determine whether the target frequency-domain resource is idle.

In one embodiment, the first node executes Q1 energy detections in the Q1 time sub-pools respectively, and the Q1 energy detections are used to determine whether the target frequency-domain resource can be used by the first node for transmitting a radio signal.

In one embodiment, the first node executes Q1 energy detections in the Q1 time sub-pools respectively, the Q1 energy detections are energy detections in LBT, and the specific meaning and implementation method of the LBT can be found in 3GPP TS36. 889.

In one embodiment, the first node executes Q1 energy detections in the Q1 time sub-pools respectively, the Q1 energy detections are energy detections in CCA, and the specific meaning and implementation method of the CCA can be found in 3GPP TR36. 889.

In one embodiment, the first node executes Q1 energy detections in the Q1 time sub-pools respectively, and any of the Q1 energy detections is implemented through energy detection in WiFi.

In one embodiment, the first node executes Q1 energy detections in the Q1 time sub-pools respectively, and any of the Q1 energy detections is implemented through energy detection in LTE LAA or NR LAA.

In one embodiment, time-domain resources occupied by any of the Q1 sub-pools are consecutive.

In one embodiment, each two of the Q1 time sub-pools are orthogonal (not overlapping) in time domain.

In one embodiment, a duration of any of the Q1 time sub-pools is 16 μs, or a duration of any of the Q1 time sub-pools is 9 μs.

In one embodiment, any of the Q1 time sub-pools is Tsl, the Tsl is a slot period, and the specific meaning of the Tsl can be found in 3GPP TS37.213, section 4.

In one embodiment, the channel sensing comprises an energy detection.

In one embodiment, the channel sensing comprises a coherent detection of a characteristic sequence.

In one embodiment, the channel sensing comprises a non-coherent detection of a characteristic sequence.

In one embodiment, Q2 is greater than 1, and durations of the Q2 time sub-pools in the present disclosure are the same.

In one embodiment, a duration of any of the Q2 time sub-pools is related to an SCS on the target frequency-domain resource.

In one embodiment, the first channel in the present disclosure is judged to be available includes: the first channel is judged to be idle.

Embodiment 12

Figure 12:
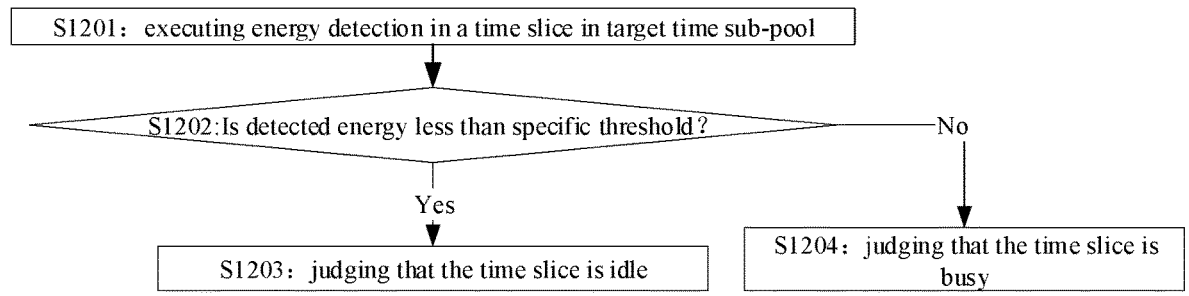
FIG. 12 illustrates a flowchart of executing an energy detection in a target time sub-pool according to one embodiment of the present disclosure.

Embodiment 12 illustrates a flowchart of executing an energy detection in a target time sub-pool, as shown in FIG. 12. The first node executes an energy detection in a time slice in a target time sub-pool in step S1201; judges whether detected energy is less than a specific threshold in step S1202; if yes, judges that the slice is idle in step S1203; if no, judges that the time slice is busy in step S1204.

In one embodiment, the specific threshold is measured by dBm.

In one embodiment, the specific threshold is measured by mW.

In one embodiment, the specific threshold is related to an SCS adopted in executed frequency-domain resources.

In one embodiment, the specific threshold is configurable.

In one embodiment, the specific threshold is a constant.

In one embodiment, the target time sub-pool comprises a plurality of consecutive time slices; the steps in FIG. 10 are executed in each of the plurality of consecutive time slices; if the plurality of consecutive time slices are assumed idle, the target time sub-pool is assumed idle, otherwise the target time sub-pool is assumed busy.

In one subembodiment of the above embodiment, the target time sub-pool is a first time sub-pool in the Q1 time sub-pools in the present disclosure.

In one subembodiment of the above embodiment, the target time sub-pool is any of the Q1 time sub-pools in the present disclosure.

In one subembodiment of the above embodiment, the target time sub-pool is the extended time sub-pool in the present disclosure.

In one subembodiment of the above embodiment, the target time sub-pool is the first time sub-pool in the present disclosure.

In one subembodiment of the above embodiment, a duration of the target time sub-pool is 16 μs.

In one subembodiment of the above embodiment, a duration of the target time sub-pool is 9 μs.

In one subembodiment of the above embodiment, a duration of the time slice is 4 μs.

In one embodiment, the specific threshold is equal to or less than −72 dBm.

Embodiment 13

Figure 13:
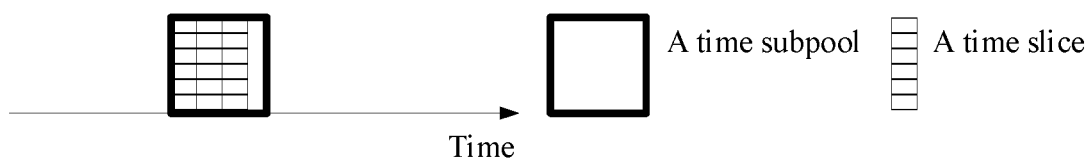
FIG. 13 illustrates a schematic diagram of a time sub-pool according to one embodiment of the present disclosure.

Embodiment 13 illustrates a schematic diagram of a time sub-pool, as shown in FIG. 13. In FIG. 13, a thick-line rectangle represents a time sub-pool, and a horizontal linefilled rectangle represents a time slice. The time slice comprises a plurality of time slices.

In one embodiment, a duration of the time sub-pool cannot be divided exactly by a duration of the time slice, that is, the time sub-pool cannot be divided into a positive integer number of time slice(s).

In one embodiment, the time sub-pool is any of the Q1 time sub-pools in the present disclosure.

In one embodiment, a duration of the time sub-pool is 16 µs.

In one embodiment, a duration of the time sub-pool is 9 µs.

In one embodiment, a duration of the time slice is 4 µs.

Embodiment 14

Figure 14:
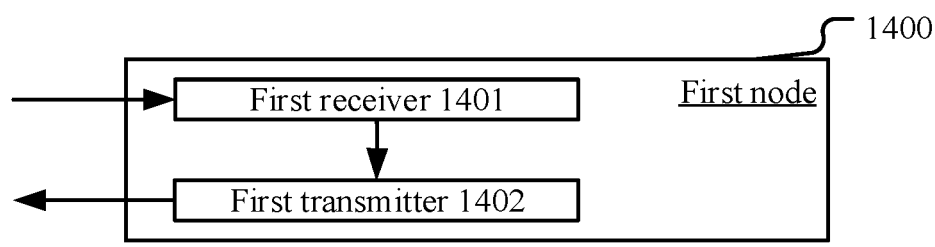
FIG. 14 illustrates a structure block diagram in a first node according to one embodiment of the present disclosure.

Embodiment 14 illustrates a structure block diagram in a first node, as shown in FIG. 14. In FIG. 14, a first node 1400 comprises a first receiver 1401 and a first transmitter 1402.

The first receiver 1401, executes a first monitoring and a second monitoring; judges whether a first channel and a second channel are available respectively according to the first monitoring and the second monitoring;

the first transmitter 1402, when the first channel is judged to be available and the second channel is judged to be unavailable, transmits a target bit block on the first channel; and when the second channel is judged to be available, transmits a target bit block on the second channel;

In embodiment 14, the first channel overlaps with the second channel in time domain; the second channel occupies K subbands in frequency domain, K being a positive integer greater than 1; when a number of idle subbands on the second channel is less than K1, the second channel is judged to be unavailable, and when a number of idle subbands on the second channel is not less than K1, the second channel is judged to be available; K1 is a positive integer not greater than K.

In one embodiment, the first transmitter 1402 only transmits a first radio signal in K2 subband(s) of the K subbands; the K2 subband(s) on the second channel is(are) judged to be idle in the second monitoring; K2 is a positive integer less than K.

In one embodiment, the second channel is judged to be available, the target bit block is used to generate a first radio sub-signal, and the first radio signal comprises the first radio sub-signal.

In one embodiment, the first receiver 1401 receives a first signaling and a target radio signal; the first signaling is used to determine at least one of time-domain resources occupied by the target radio signal or frequency-domain resources occupied by the target radio signal; the target bit block is used to determine whether the target radio signal is correctly received.

In one embodiment, the first receiver 1401 receives a second signaling; the second signaling is used to determine a first frequency-domain resource set, the first frequency-domain resource set comprises K frequency-domain resource subsets, and the K frequency-domain resource subsets are located in the K subbands respectively; a first bit block is used to generate the first radio signal; and the K frequency-domain resource subsets are reserved for transmitting the first bit block.

In one embodiment, the first receiver 1401 comprises at least first four of the antenna 452, the receiver 454, the multi-antenna receiving processor 458, the receiving processor 456 and the controller/processor 459 in Embodiment 4.

In one embodiment, the first transmitter 1402 comprises at least the first four of the antenna 452, the transmitter 454, the multi-antenna transmitting processor 457, the transmitting processor 468 and the controller/processor 459 in embodiment 4.

Embodiment 15

Figure 15:
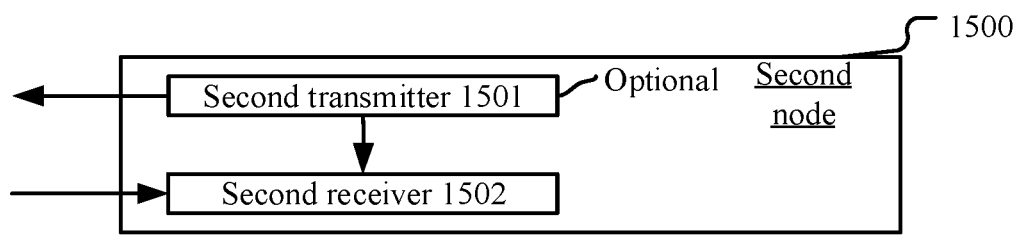
FIG. 15 illustrates a structure block diagram in a second node according to one embodiment of the present disclosure.

Embodiment 15 illustrates a structure block diagram of in a second node, as shown in FIG. 15. In FIG. 15, a second node 1500 comprises a second transmitter 1501 and a second receiver 1502; herein, the second transmitter 1501 is optional.

the second transmitter 1501 transmits a first signaling and a target radio signal;

a second receiver 1502, detects a target bit block in both a first channel and a second channel;

In embodiment 15, the first channel overlaps with the second channel in time domain; the second channel occupies K subbands in frequency domain, K being a positive integer greater than 1; a transmitter of the target bit block is a first node, the first node executes a first monitoring and a second monitoring, and judges whether the first channel and the second channel are available respectively according to the first monitoring and the second monitoring; when a number of idle subbands on the second channel is less than K1, the second channel is judged to be unavailable, and the first node transmits the target bit block on the first channel; when a number of idle subbands on the second channel is not less than K1, the second channel is judged to be available and the first node transmits the target bit block on the second channel; K1 is a positive integer not greater than K; the first signaling is used to determine at least one of time-domain resources occupied by the target radio signal or frequency-domain resources occupied by the target radio signal; the target bit block is used to determine whether the target radio signal is correctly received.

In one embodiment, the second receiver 1502 detects a radio signal generated by a first bit block in the K subbands; the first node only transmits a first radio signal in K2 subband(s) of the K subbands; the first bit block is used to generate the first radio signal, and the K2 subband(s) on the second channel is(are) judged to be idle in a second monitoring; the first node executes the second monitoring; K2 is a positive integer less than K.

In one embodiment, the second channel is judged to be available, the target bit block is used to generate a first radio sub-signal, and the first radio signal comprises the first radio sub-signal.

In one embodiment, the second transmitter 1501 transmits a second signaling; the second signaling is used to determine a first frequency-domain resource set, the first frequency-domain resource set comprises K frequency-domain resource subsets, and the K frequency-domain resource subsets are located in the K subbands respectively; and the K frequency-domain resource subsets are reserved for transmitting the first bit block.

In one embodiment, the second transmitter 1501 comprises at least first four of the antenna 420, the transmitter 418, the multi-antenna transmitting processor 471, the transmitting processor 416 and the controller/processor 475 in Embodiment 4.

In one embodiment, the second receiver 1502 comprises at least the first four of the antenna 420, the receiver 418, the multi-antenna receiving processor 472, the receiving processor 470 and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node and the second node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The base station in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations, RSUs and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, executing a first monitoring and a second monitoring; judging whether a first channel and a second channel are available respectively according to the first monitoring and the second monitoring; and
   a first transmitter, when the first channel is judged to be available and the second channel is judged to be unavailable, transmitting a target bit block on the first channel; when the second channel is judged to be available, transmitting a target bit block on the second channel;
   wherein the first channel overlaps with the second channel in time domain; the second channel occupies K subbands in frequency domain, K being a positive integer greater than 1; when a number of idle subbands on the second channel is less than K1, the second channel is judged to be unavailable, and when a number of idle subbands on the second channel is not less than K1, the second channel is judged to be available; K1 is a positive integer not greater than K; the first monitoring is a Listen Before Talk (LBT), or the first monitoring is a Clear Channel Assessment (CCA); the second monitoring is a Listen Before Talk (LBT), or the second monitoring is a Clear Channel Assessment (CCA); the first channel is for PUCCH transmission, and the second channel is for PUSCH transmission.

2. The first node according to claim 1, wherein the first transmitter transmits a first radio signal in K2 subband(s) of the K subbands; and the K2 subband(s) on the second channel in the second monitoring is(are) judged to be idle; K2 is a positive integer less than K.

3. The first node according to claim 2, wherein the second channel is judged to be available, the target bit block is used to generate a first radio sub-signal, and the first radio signal comprises the first radio sub-signal.

4. The first node according to claim 1, wherein the first receiver receives a first signaling and a target radio signal; the first signaling is used to determine at least one of time-domain resources occupied by the target radio signal or frequency-domain resources occupied by the target radio signal; and the target bit block is used to determine whether the target radio signal is correctly received.

5. The first node according to claim 2, wherein the first receiver receives a second signaling, the second signaling is used to determine a first frequency-domain resource set, the first frequency-domain resource set comprises K frequency-domain resource subsets, and the K frequency-domain resource subsets are located in the K subbands respectively; a first bit block is used to generate the first radio signal; and the K frequency-domain resource subsets are reserved for transmitting the first bit block.

6. The first node according to claim 1, wherein the second channel can be used to transmit data and control information, and the first channel can only be used to transmit control information, or the first channel is a PUCCH and the second channel is a PUSCH; and the target bit block comprises at least one of an HARQ feedback or a CSI.

7. The first node according to claim 1, wherein the K1 is equal to a product of K and a first coefficient rounded to an integer; the first coefficient is fixed, or the first coefficient is configured by a higher-layer signaling; the first coefficient is equal to X percent, X being a positive integer greater than 0 not greater than 100.

8. The first node according to claim 2, wherein the second channel is judged by the first node to be available, and the first node transmits a target bit block on the second channel; the target bit block comprises K second-type bit sub-blocks, the K second-type bit sub-blocks are respectively mapped into the K subbands, and K2 second-type bit sub-block(s) in the K second-type bit sub-blocks is(are respectively) mapped into the K2 subband(s) of the K subbands; the first bit block is used to generate the K sub-radio signals, the K sub-radio signals are mapped into K subbands respectively, and K2 sub-radio signal(s) mapped into the K2 subband(s) in the K sub-radio signals consists(consist) of the first radio signal; the K sub-radio signals respectively correspond to K Code Block Groups (CBG)s, and the K2 sub-radio signal(s) corresponds(respectively correspond) to K2 CBG(s) in the K CBGs; and the K2 second-type bit sub-block(s) is(are respectively) transmitted in the K2 sub-radio signal(s).

9. A second node for wireless communications, comprising:
   a second receiver, detecting a target bit block in both a first channel and a second channel;
   wherein the first channel overlaps with the second channel in time domain; the second channel occupies K subbands in frequency domain, K being a positive integer greater than 1; a transmitter of the target bit block is a first node, the first node executes a first monitoring and a second monitoring, and judges whether the first channel and the second channel are available respectively according to the first monitoring and the second monitoring; when a number of idle subbands on the second channel is less than K1, the second channel is judged to be unavailable, and the first node transmits the target bit block on the first channel; when a number of idle subbands on the second channel is not less than K1, the second channel is judged to be available and the first node transmits the target bit block on the second channel; K1 is a positive integer not greater than K; the first monitoring is a Listen Before Talk (LBT), or the first monitoring is a Clear Channel Assessment (CCA);

the second monitoring is a Listen Before Talk (LBT), or the second monitoring is a Clear Channel Assessment (CCA); the first channel is for PUCCH transmission, and the second channel is for PUSCH transmission.

10. The second node according to claim 9, wherein the second receiver detects a radio signal generated by a first bit block in the K subbands; and the first node transmits a first radio signal in only K2 subband(s) of the K subbands; the first bit block is used to generate the first radio signal, and the K2 subband(s) on the second channel is(are) judged to be idle in a second monitoring; the first node executes the second monitoring; K2 is a positive integer less than K.

11. The second node according to claim 10, wherein the second channel is judged to be available, the target bit block is used to generate a first radio sub-signal, and the first radio signal comprises the first radio sub-signal.

12. The second node according to claim 9, comprising:
the second transmitter, transmitting a first signaling and a target radio signal;
wherein the first signaling is used to determine at least one of time-domain resources occupied by the target radio signal or frequency-domain resources occupied by the target radio signal; and the target bit block is used to determine whether the target radio signal is correctly received.

13. The second node according to claim 10, wherein the second transmitter transmits a second signaling, the second signaling is used to determine a first frequency-domain resource set, the first frequency-domain resource set comprises K frequency-domain resource subsets, and the K frequency-domain resource subsets are located in the K subbands respectively; and the K frequency-domain resource subsets are reserved for transmitting the first bit block.

14. A method in a first node for wireless communications, comprising:
executing a first monitoring and a second monitoring; judging whether a first channel and a second channel are available respectively according to the first monitoring and the second monitoring; and
when the first channel is judged to be available and the second channel is judged to be unavailable, transmitting a target bit block on the first channel; when the second channel is judged to be available, transmitting a target bit block on the second channel;
wherein the first channel overlaps with the second channel in time domain; the second channel occupies K subbands in frequency domain, K being a positive integer greater than 1; when a number of idle subbands on the second channel is less than K1, the second channel is judged to be unavailable, and when a number of idle subbands on the second channel is not less than K1, the second channel is judged to be available; K1 is a positive integer not greater than K; the first monitoring is a Listen Before Talk (LBT), or the first monitoring is a Clear Channel Assessment (CCA); the second monitoring is a Listen Before Talk (LBT), or the second monitoring is a Clear Channel Assessment (CCA); the first channel is for PUCCH transmission, and the second channel is for PUSCH transmission.

15. The method in a first node according to claim 14, comprising:
transmitting a first radio signal in K2 subband(s) of the K subbands;
wherein the K2 subband(s) on the second channel is(are) judged to be idle in the second monitoring; K2 is a positive integer less than K.

16. The method in a first node according to claim 14, comprising:
receiving a first signaling and a target radio signal;
wherein the first signaling is used to determine at least one of time-domain resources occupied by the target radio signal or frequency-domain resources occupied by the target radio signal; and
the target bit block is used to determine whether the target radio signal is correctly received.

17. The method in a first node according to claim 15, comprising:
receiving a second signaling;
wherein the second signaling is used to determine a first frequency-domain resource set, the first frequency-domain resource set comprises K frequency-domain resource subsets, and the K frequency-domain resource subsets are located in the K subbands respectively; a first bit block is used to generate the first radio signal; and the K frequency-domain resource subsets are reserved for transmitting the first bit block.

18. The method in a first node according to 14, wherein the second channel can be used to transmit data and control information, and the first channel can only be used to transmit control information, or the first channel is a PUCCH and the second channel is a PUSCH; and the target bit block comprises at least one of an HARQ feedback or a CSI.

19. The method in a first node according to claim 14, wherein K1 is equal to a product of K and a first coefficient rounded to an integer; the first coefficient is fixed, or the first coefficient is configured by a higher-layer signaling; the first coefficient is equal to X percent, X being a positive integer greater than 0 not greater than 100.

20. The method in a first node according to claim 15, wherein the second channel is judged by the first node to be available, and the first node transmits a target bit block on the second channel; the target bit block comprises K second-type bit sub-blocks, the K second-type bit sub-blocks are respectively mapped into the K subbands, and K2 second-type bit sub-block(s) in the K second-type bit sub-blocks is(are respectively) mapped into the K2 subband(s) of the K subbands; the first bit block is used to generate the K sub-radio signals, the K sub-radio signals are mapped into K subbands respectively, and K2 sub-radio signal(s) mapped into the K2 subband(s) in the K sub-radio signals consists (consist) of the first radio signal; the K sub-radio signals respectively correspond to K Code Block Groups (CBG)s, and the K2 sub-radio signal(s) corresponds(respectively correspond) to K2 CBG(s) in the K CBGs; and the K2 second-type bit sub-block(s) is(are respectively) transmitted in the K2 sub-radio signal(s).

* * * * *